Patented Apr. 15, 1947

2,419,120

UNITED STATES PATENT OFFICE 2,419,120

MACHINE TOOL CUTTING SPEED INDICATOR

Robert H. Clark, Solon, Ohio, assignor to The Warner & Swasey Company, Cleveland, Ohio, a corporation of Ohio Application December 14, 1944, Serial No. 568,193

4 Claims. (Cl. 177—311)

This invention relates to a machine tool and more particularly to the provision of an electrical indicating mechanism used in conjunction with a movable part of a machine tool.

An object of the invention is to provide an electrical indicating mechanism for use with a machine tool to facilitate the operation and improve the efficiency thereof.

Another object is to provide in a machine tool having a part which is movable at different rates and means for selecting or preselecting such different rates of movement of said part, an electrical indicating mechanism which is responsive to the operation of said selecting or preselecting means.

Another object is to provide an improved electrical indicating mechanism for indicating the surface or cutting speeds of a rotating work piece or a cutting tool and in relation to different diameters.

Further and additional objects and advantages will become apparent hereinafter during the description of embodiments of the invention which is to follow.

Figure 1:
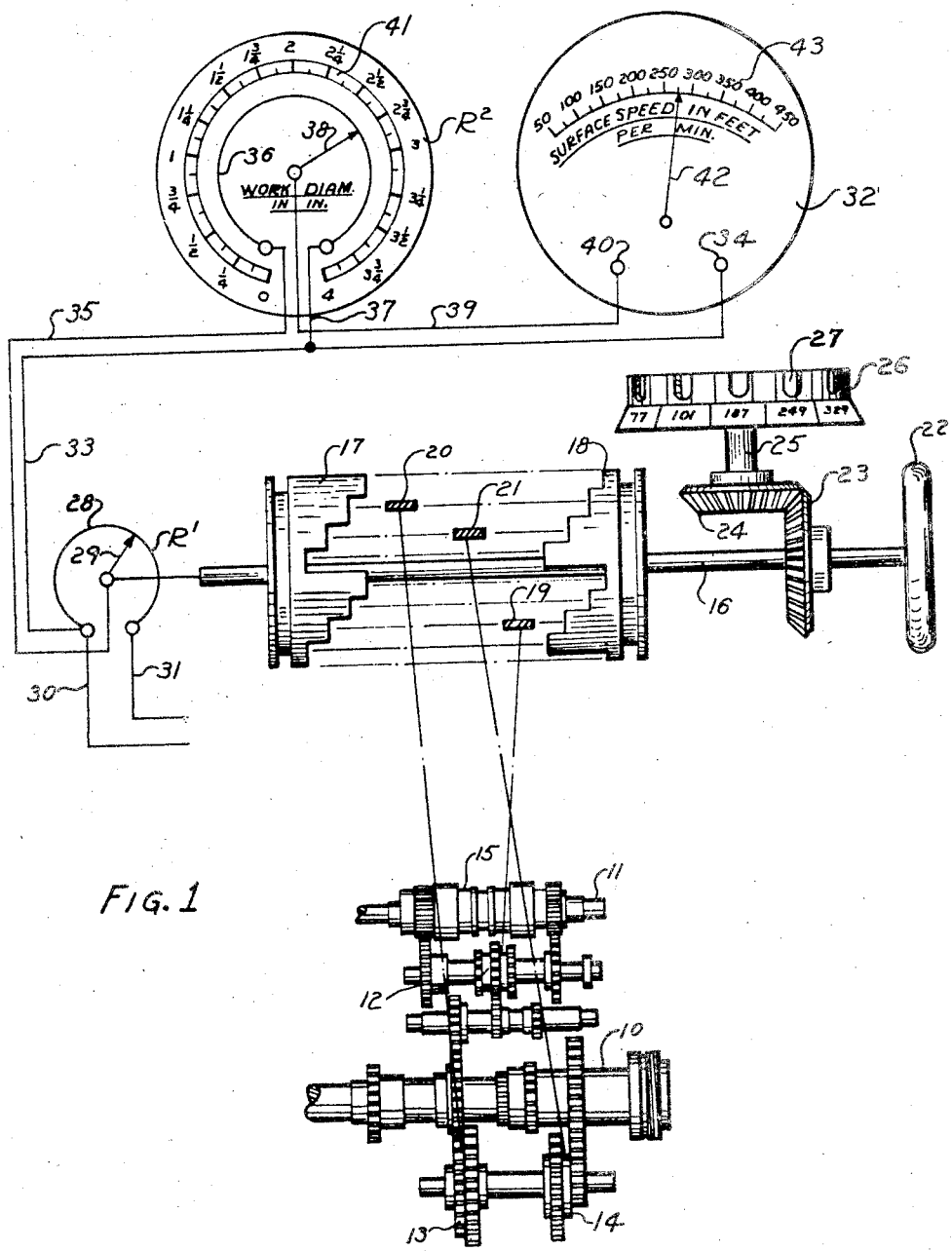
Figure 2:
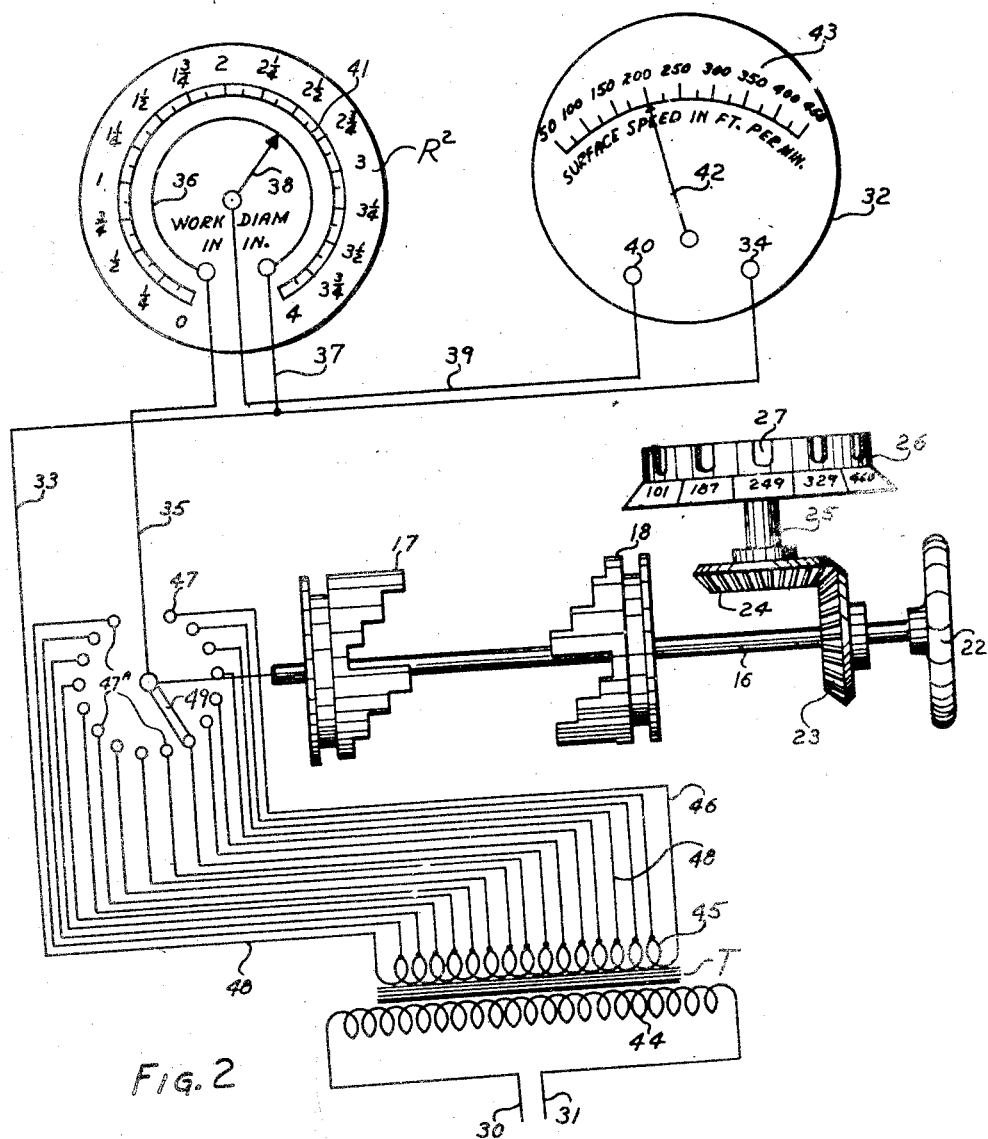

Referring to the accompanying drawings,

Fig. 1 illustrates an application to a machine tool of an electrical indicating mechanism embodying the invention, certain parts of the machine tool being diagrammatically illustrated to bring out the relationship thereof to the indicating mechanism, while Fig. 2 depicts a different form of electrical indicating mechanism also embodying the invention.

Although the electrical indicating mechanisms may be operatively associated with various types of speed selectors for a movable part of a machine tool the said mechanisms are, for purposes of illustration, shown as operatively connected with the arrangement for selecting or preselecting the different speeds of the work spindle of a lathe and which arrangement is fully disclosed in Patent No. 2,068,552, issued to Max E. Lange, January 19, 1937.

Referring to Fig. 1, the change speed transmission drive for the work spindle 10 is indicated somewhat diagrammatically. It will be understood that the work spindle 10 is rotatably supported in the headstock of the machine tool and is driven from the shaft 11, in this instance, at any one of twelve different speeds through gearing which includes a three-step shiftable gear cone 12, a rear two-step shiftable gear cone 13 and a front two-step shiftable gear cone 14, as will be well understood and as is fully disclosed in said Lange patent. The shaft 11 is provided with suitable clutch means 15 whereby said shaft can be connected to the change speed gearing for forward or reverse drive thereof or can be disconnected therefrom.

In the said Lange patent there is disclosed an indexible shaft 16, suitably supported in the headstock or in some other part of the machine and mounted on said shaft to rotate with it but capable of moving axially relative thereto are spools 17 and 18 and which spools are provided on their adjacent faces with series of long and short projections, short and long projections and projections of equal length, correlated to the different speeds of the spindle. Elements 19, 20 and 21 are located intermediate the adjacent faces of the spools 17 and 18 and are operatively connected, respectively, with the three-step gear cone 12, the rear two-step gear cone 13 and the front two-step gear cone 14 by suitable mechanism represented diagrammatically in the drawing by the dash and dot lines. The spools 17 and 18 are moved toward and away from each other axially of the shaft 16 with an equalized movement by mechanism not shown, since it is fully disclosed in said Lange patent.

In order to select the different spindle speeds the spools 17 and 18 are moved away from each other to the position shown in the drawing and then are indexed by rotating the shaft 16 to proper positions correlated to the spindle speeds, after which they are moved toward each other to bring the series of projections into engagement with some or all of the elements 19, 20 and 21 to shift said elements and in turn to shift the gear cones of the transmission to obtain the selected spindle speed.

The mechanism disclosed in the Lange patent for moving the spools toward and away from each other with an equalized movement is operatively connected with the mechanism which engages and disengages the clutch 15. The different spindle speeds may be selected after the clutch 15 has been disengaged at the end of one operative step in the work cycle or the spindle speeds may be preselected, that is, the spools are brought to their separated positions and are indexed during one operative step of the work cycle to the position corresponding to the spindle speed for the next operative step and then when the current operative step is completed the clutch 15 is disengaged and the spools are brought inwardly toward each other to obtain the spindle speed that has been preselected for the next operative step. This mode of selecting or preselecting the different spindle speeds is clearly disclosed in said Lange patent and need not be explained in greater detail herein.

The shaft 16 may be indexed by means of a hand wheel or knob 22 fixed to the end of the shaft at the front of the headstock or it may be indexed by any other suitable means. The shaft 16 may have fixed thereto a gear 23 which meshes with a gear 24 mounted on a stub shaft 25 rotatably supported by the headstock and having fixed thereto an indicating dial or drum 26 bearing indicia corresponding to the different spindle speeds in revolutions per minute, wherefore when the spools are indexed the dial or drum 26 will also be indexed to indicate in terms of spindle speeds the positions of the spools. The dial or drum 26 may be provided with slots 27 and in which slots number blocks representing the different operative steps of the work cycle can be removably positioned. This latter arrangement is fully disclosed in Lange Patent No. 2,169,765, issued August 15, 1939.

Although the electrical indicating mechanism embodying the present invention is illustrated as used in conjunction with the selecting or preselecting arrangement disclosed in said Lange patents hereinbefore referred to, it will be understood that said electrical indicating mechanism may be operatively associated with other forms or arrangements for selecting or preselecting the different rates of movement of a movable part of a machine tool.

Referring to said Fig. 1, a rheostat $R^1$ is operatively associated with the shaft 16 and said rheostat comprises a resistance element 28 and a wiper 29 that coacts with the resistance element and is operatively connected to the shaft 16 to turn therewith. Consequently the indexing movement imparted to said shaft and to the spools 17 and 18 will also be imparted to the wiper 29 to vary its contacting position with respect to the resistance element 28 of the rheostat. Consequently the rheostat will be adjusted automatically in accordance with the spindle speed selecting indexing movements imparted to the spools. The resistance element 28 has its ends electrically connected to electrical conduits 30 and 31 which extend to a suitable source of regulated voltage power supply not shown. In other words, a constant voltage is impressed upon the resistance element 28 of the rheostat but the rheostat output voltage is varied in proportion and in correlation with the different indexed positions of the spools 17 and 18, that is, in relation to the different speeds of the spindle 10. The output voltage of the rheostat is impressed on a volt meter 32 of suitable and well known construction and said volt meter may be calibrated in spindle speeds, i. e., R. P. M. if desired. The resistance element 28 of the rheostat is directly connected by an electrical lead 33 with the terminal 34 of the volt meter 32. The wiper 29 of the rheostat $R^1$ is electrically connected to an electrical lead 35 which is connected to one terminal of the resistance element 36 of a second rheostat $R^2$, the other terminal of said resistance element 36 being connected with the lead 33 by the short electrical lead 37. The rheostat $R^2$ includes a movable wiper 38 which cooperates with the resistance element 36 and which wiper is electrically connected by a lead 39 with the terminal 40 of the volt meter 32. It will thus be seen that adjustment of the rheostat $R^2$ will vary the output voltage of the rheostat $R^1$ and that the voltage ultimately impressed on the volt meter 32 will be the constant voltage supplied to the rheostat $R^1$ reduced in accordance with the combined settings of the rheostats $R^1$ and $R^2$.

The rheostat $R^2$ is provided with a scale 41 indicating the diameters in inches of the work mounted on the spindle 10 and said scale cooperates with the wiper 38; in other words, the rheostat $R^2$ is calibrated in terms of work diameters in inches and said rheostat is manually adjustable by the operator of the machine. The pointer 42 of the volt meter 32 cooperates with a scale 43 representing the peripheral surface speed of the work piece in feet per minute, that is, the cutting speed of the tool in relation to the work piece. The volt meter is thus calibrated to indicate surface speed of the work piece in feet per minute.

Since a regulated or constant voltage is impressed on the rheostat $R^1$ and this rheostat is adjusted in accordance with the indexing movements imparted to the spindle speed selector or preselector mechanism the output voltage of the rheostat $R^1$ will be in proportion to the spindle speed selected or preselected. The operator before selecting or preselecting the spindle speed manually adjusts the rheostat $R^2$ until the wiper 38 points to the graduation on the scale 41 representing in inches the diameter of the work piece. Inasmuch as the rheostat $R^2$ is in the output circuit of the rheostat $R^1$ a proportion only of the output of rheostat $R^1$ is impressed on the volt meter 32. Inasmuch as the rheostat $R^1$ proportions the voltage in accordance with spindle speeds (R. P. M.) and the rheostat $R^2$ proportions the voltage in accordance with the work diameters, the ultimate voltage impressed on the volt meter 32 will be proportional to the surface speed of the work piece or the cutting speed of the tool moving relative to the work piece. The volt meter 32 will thus indicate within the limits of its calibration for different diameters of work the surface speed of the work or the cutting speed of the tool in feet per minute.

The operator of a machine tool equipped with the electrical indicating mechanism described needs only to adjust the rheostat $R^2$ to the known work diameter, in addition to operating the speed selector in order to obtain a direct and accurate indication on the volt meter 32 of the surface or cutting speeds.

In Fig. 2 a different embodiment of the invention is shown. However, since this form differs from the form of Fig. 1, only in the use of a transformer having a plurality of taps extending from its secondary coil instead of the rheostat $R^1$, the same reference numerals are employed in Figs. 1 and 2 to indicate identical parts.

The form illustrated in Fig. 2 utilizes a transformer T to vary the input voltage in relation to spindle speeds and the primary coil 44 thereof is connected to the electrical conduits 30 and 31 which extend to a suitable source, not indicated, of power supply. The secondary coil 45 of the transformer T is connected by the leads 33 to the terminal 34 of the volt meter 32 and by the lead 46 to the contact 47 of a multi-contact switch, the other contacts 47a of which are connected by tap leads 48 to the successive turns of the secondary coil. A movable switch contact arm 49 is connected to the lead 35 and can be selectively engaged with the switch contact 47 or any of the other contacts 47a. The arm 49 is operatively connected with the shaft 16 and is moved selectively into various positions related to the indexed positions of the spools 17 and 18 and to the selected or preselected spindle speeds.

The form of the invention shown in Fig. 2 operates and functions in the manner described for the form of Fig. 1 and hence need not be set forth herein.

Although several preferred embodiments of the invention have been illustrated and described herein it will be understood that the invention is susceptible of various modifications and adaptations within the scope of the appended claims.

Having thus described my invention, I claim:

1. In a machine tool having a rotatable work spindle adapted to mount work pieces of different diameters to be machined by a cutting tool, a gear transmission adapted to be clutched to a power shaft and operatively connected to the spindle and including shiftable means for obtaining a plurality of different predetermined gear ratios in said transmission to rotate said spindle at a corresponding number of different speeds, movable means operatively associated with said shiftable means and when moved to one position indexible in correlation to the different gear ratios to select or preselect the different spindle speeds and when moved to another position actuating said shiftable means to obtain the selected or preselected spindle speed, voltage regulating means operatively connected to said movable means and adjusted by the indexing thereof to vary the voltage of the output side of said regulating means, means for impressing a constant or regulated voltage on the input side of said voltage regulating means, a volt meter calibrated in terms of cutting speeds of a tool operating on the work piece, and electrical connections between said volt meter and the output side of said voltage regulating means and including a second voltage regulating means calibrated in terms of work diameters and manually adjusted to positions correlated to the diameter of the work currently being machined to vary the voltage impressed on said volt meter, whereby said volt meter indicates cutting speeds in relation to work diameter instantly upon indexing of said movable means to select or preselect the spindle speed and prior to the movement of said movable means to actuate said shiftable means to obtain the selected or preselected spindle speed.

2. A machine tool as defined in claim 1 and wherein both of said voltage regulating means are in the form of rheostats.

3. A machine tool as defined in claim 1 and wherein said first mentioned voltage regulating means includes a transformer having its primary coil connected to a supply source of constant or regulated voltage current while its secondary coil is connected to said second mentioned voltage regulating means and a terminal of said volt meter and to a plurality of switch contacts by tap leads, a movable switch arm adapted to engage said contacts and operatively associated with said movable means to be moved by the indexing thereof, an electrical connection between said arm and another terminal of said volt meter and including said second mentioned voltage regulating means with said second mentioned voltage regulating means in the form of a rheostat.

4. In a machine tool having a rotatable work spindle adapted to mount work pieces of different diameters to be machined by a cutting tool, a gear transmission adapted to be clutched to a power shaft and operatively connected to the spindle and including shiftable gear cones for obtaining a plurality of different predetermined gear ratios in said transmission to rotate said spindle at a corresponding number of different speeds, an indexible shaft having splined thereon a pair of spools movable toward and away from each other and provided on their adjacent faces with cooperating series of projections, actuating means for shifting said gear cones and having portions located intermediate said spools, said spools when moved to a separated position relative to each other being indexible with said shaft in correlation to the different shifted positions of said gear cones to select or preselect the different spindle speeds and when moved axially of said shaft toward each other acting on said actuating means to move the same to shift the gear cones to obtain the selected or preselected spindle speed, voltage regulating means operatively connected to said shaft and adjusted by the indexing thereof to vary the voltage of the output side of said regulating means, means for impressing a constant or regulated voltage on the input side of said voltage regulating means, a volt meter calibrated in terms of cutting speeds of a tool operating on the work piece, and electrical connections between said volt meter and the output side of said voltage regulating means and including a rheostat calibrated in terms of work diameters and manually adjusted to positions correlated to the diameter of the work currently being machined to vary the voltage impressed on said volt meter, whereby said volt meter indicates cutting speeds in relation to work diameter instantly upon the indexing of said shaft and spools to select or preselect the spindle speed and prior to the movement of said spools axially toward each other to operate the actuating means to shift the gear cones to obtain the selected or preselected spindle speed.

ROBERT H. CLARK.

REFERENCES CITED

The following references are of record in the file of this patent:

UNITED STATES PATENTS

| Number | Name | Date |
|---|---|---|
| 2,338,599 | Ridgeway | Jan. 4, 1944 |
| 1,820,242 | Nieman | Aug. 25, 1931 |
| 2,193,077 | Saxman | Mar. 12, 1940 |

OTHER REFERENCES

Reeves Electric Remote Speed Indicator by Reeves Pulley Co., Columbus, Indiana; 4 pages; received in the Patent Office Library September 11, 1942. (Copy in Div. 42, class 177—311.22.)